Sept. 21, 1943.   C. L. HALL   2,329,894

FASTENER AND FASTENER INSTALLATIONS

Filed Feb. 26, 1942

Inventor:
Charles L. Hall.
By John Todd
Att'y.

Patented Sept. 21, 1943

2,329,894

UNITED STATES PATENT OFFICE 2,329,894

FASTENER AND FASTENER INSTALLATION

Charles L. Hall, Detroit, Mich., assignor to United-Carr Fastener Corporation, Cambridge, Mass., a corporation of Massachusetts Application February 26, 1942, Serial No. 432,426

7 Claims. (Cl. 24—81)

This invention relates to an improved wiring clip and installations of the same.

One object of my invention is the provision of a wiring clip device, having a clip member secured to a supporting structure by the novel fastener method hereinbelow set out.

Another object of my invention relates to the provision of a clip member capable of surrounding and gripping a plurality of wires to hold the wires in secure assembly one with another.

Another object of my invention relates to the construction of the clip member, wherein a loop is provided having a strip of insulation, such as rubber, secured to the inner face thereof, the strip being adapted to form a substantially continuous ring when the ends of the loop are brought into interlocking fastened relation.

Other objects and uses of my invention are apparent from inspection of the drawing and specification hereinbelow set forth.

Referring to the drawing, in which I have illustrated preferred embodiments of my invention:

Figure 1:
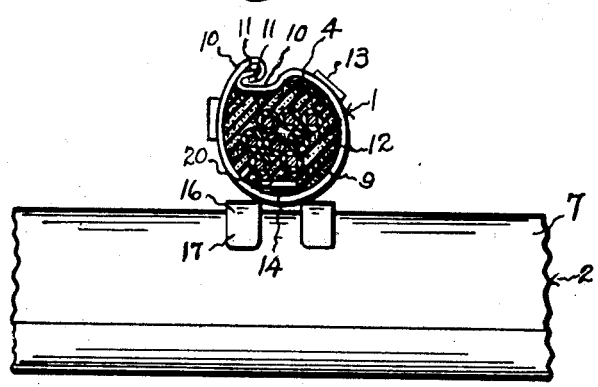
Fig. 1 is a front view showing my improved wiring clip carrying a plurality of lead wires and secured to a supporting part.
Figure 2:
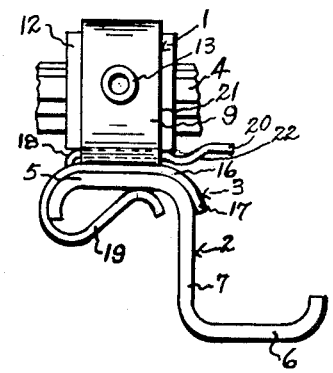
Fig. 2 is a side elevation of the installation shown in Fig. 1.
Figure 3:
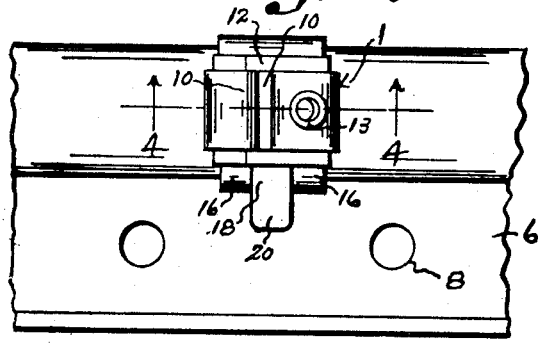
Fig. 3 is a top view of the installation shown in Figs. 1 and 2 with the lead wires omitted.
Figure 4:
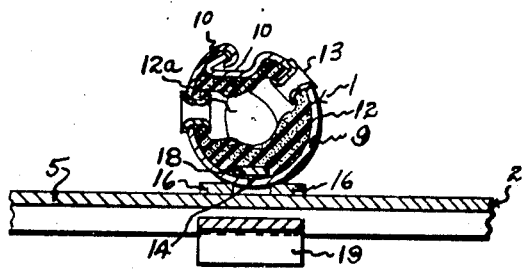
Fig. 4 is a sectional view taken along the line 4—4 of Fig. 3.
Figure 5:
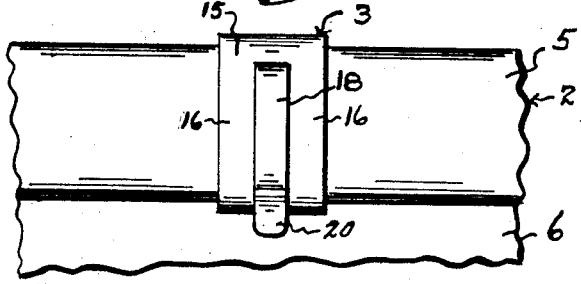
Fig. 5 is a top plan view of my preferred supporting part prior to attachment of the clip member thereto and showing a preferred attaching member by which the clip member is secured to the support.
Figure 6:
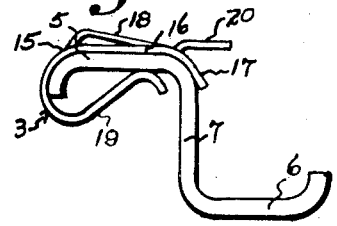
Fig. 6 is a side elevation of the installation shown in Fig. 5.

Referring to my preferred installation illustrated in Figs. 1-7 of the drawing, I have shown an improved clip device which is particularly useful in aircraft manufacture for securing lead wires, conduits, and the like, to the frame of the craft. My preferred installation includes a clip or loop member 1 secured to a supporting part 2 by means of an attaching member 3. The loop member 1 is adapted to receive and grip one or more lead wires 4 to maintain the lead wires in fixed relation to the supporting part. The supporting part 2 may be of any suitable shape, but, in my preferred installation, I have chosen to show a generally S-shaped member providing wing elements 5 and 6 joined by an intermediate portion 7. The wing element 5 preferably presents a support for the clip device and the wing element 6 provides a series of apertures 8 for receiving screws and the like, by which the part 2 is secured to another part of the airplane frame.

The loop member 1 is formed from a single strip of spring metal and provides a bowed body portion 9 and end elements 10—10. Each of the end elements 10—10 has a reverse-bend element 11 at its outermost end and spaced from its respective end element 10 so as to provide a seat. The reverse-bend elements extend in opposite directions so as to engage one with another when the loop is closed. The reverse-bend elements 11—11 are moved into engaged relation by passing one of the elements beneath the other against the normal tension of the bowed body portion 9 to interlock the same, as shown most clearly in Figs. 1 and 4. In order to insulate the wires 4 from the metal body 9 of the loop elements, a strip 12 of insulating material, which is preferably of sponge rubber, is disposed on the inner face of the body 9 and secured thereto in my preferred form by rivets 13 which are headed over upon the outer surface of the body 9 and the inner surface of the strip 12. It will be seen from inspection of Fig. 4 that the rivets 13 are preferably placed intermediate the end elements 10 of the loop and a point 14 of the loop substantially diametrically opposite the end elements so that the strip 12 is in free unsecured relation to the body 9 at the point 14 for a purpose to be described.

The attaching member 3 of my preferred installation provides a base 15 having a pair of rigid fingers 16—16 at one end in spaced parallel relation one to another. Each of the fingers 16 may have a downwardly bent outermost free end portion 17 so as to engage more closely the contour of the supporting part 2, as most clearly shown in Fig. 2. A spring tongue element 18 is integrally joined to the base 15 and extends from the base intermediate the fingers 16 in the same direction as the fingers. The spring tongue element 18 is preferably formed from material taken from between the fingers 16, and the tongue is struck from the plane of the fingers 16 so as to be disposed slightly above the same, as most clearly shown in Fig. 6, to enable the width of the body 9 to be moved intermediate the tongue and the fingers. A spring arm 19 integral with the base 15 is bent under the rigid fingers 16 and cooperates with the rigid fingers so that the elements engage opposed surfaces of the wing 5, as most clearly shown in Fig. 6, to secure the attaching member to the supporting part. It is understood that although the particular attaching member that I have illustrated provides elements such as the rigid fingers 16 and the arm 19 which are shaped and formed to engage with a supporting part of the preferred construction illustrated, the elements of the attaching member could be modified to engage a supporting part of slightly different form such as a completely flat panel without departing from the scope and spirit of my invention.

Figure 7:
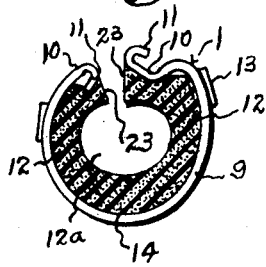
Fig. 7 is a front view showing one of my improved clip members in open position.

Assembly of the parts of my clip device is a relatively simple matter and is preferably accomplished by first snapping the respective attaching members 3 over the wing element 5 of the supporting part at spaced points along the length of the supporting part. Immediately thereafter, or at such time as it is desired to secure the wires in position, the loop members 1 are secured in fastened engagement with the respective attaching members. Attachment of one of the loop members 1 to its respective attaching member 3 is carried out by moving the body 9 of the loop element at the point 14 between the spring tongue 18 and the rigid fingers 16 of the attaching member. This is accomplished by first inserting the free end 20 of the spring tongue 18 between the point 14 of the body 9 and the rubber strip 12 which is free from the body 9 at that point and, thereafter, pushing the loop 1 along the tongue until an edge 21 of the loop (Fig. 2) snaps by a depressed cam element 22 of the spring tongue, as most clearly shown in Fig. 2. The loop 1 is now detachably assembled with the supporting part with its ends in spaced position, as shown in Fig. 7, to permit the wires 4 to be disposed within the loop. After the wires have been placed within the pocket 12a of the strip 12 the ends 10 of the loop are brought into interlocking closed relation. The act of interlocking the ends of the loop brings the ends 23 of the rubber strip 12 into abutting relation so that the rubber strip forms a complete ring surrounding the wires 4 and insulating the wires from the metal clip. A feature of my invention is embodied in the use of a sponge rubber strip which, by reason of its extreme contractability, is capable of surrounding and holding together under slight tension a varying number of wires. Thus, the clip device may be used, without the necessity of modifying any of its parts, to hold from one to twelve wires in my preferred size as illustrated.

Figure 8:
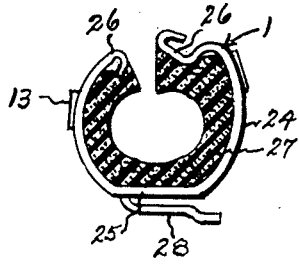
Fig. 8 is a modified form of clip member providing an attaching element integral with the clip member.

In Fig. 8 I have shown a modified construction of my clip device, wherein the attaching member is provided as an integral part of the loop member. Thus, referring to Fig. 8 I have shown a loop member 24 which is substantially identical with the loop member 1 of my first form, except that a portion 25 of the loop member 24, which is disposed in diametrically opposite relation to the loop ends 26, is formed substantially flat so as to lie flush with the flat surface of a supporting panel (not shown) to which the clip may be attached. The member 24 carries an inner strip of sponge rubber 27 in the manner of my first form. As a means for securing the loop member 24 to the supporting structure a spring hook element 28 is pressed from the material of the loop 24 so as to be disposed beneath the loop, viewing Fig. 8, in spaced substantially parallel relation to the flat portion 25 of the loop. In securing my modified clip device to a flat supporting panel (not shown), the edge of the panel is moved between the flat portion 25 of the loop member and the spring element 28, and the panel is engaged between the same whereby the clip is secured firmly thereto.

Although I have illustrated and described preferred embodiments of my invention, I do not wish to be limited thereby because the scope of my invention is best defined by the following claims.

I claim:

1. A fastener device comprising an article-gripping member having a bowed portion formed of flat sheet metal material, an attaching member having a base portion, said base having a rigid element and a resilient element, said elements engaging opposite sides of said article-gripping member so as to be secured in applied position thereto, and said attaching member having a spring arm element extending on one side of said base, said arm element and said base engaging opposed sides of a supporting part to secure said article-gripping member to said part.

2. A fastener device comprising a resilient loop adapted to receive and grip an article, said loop having a bowed body portion and free ends movable into tightening position, a one-piece attaching member having a base portion, said base having elements engaging opposite sides of said bowed member on its side opposed to said free ends so as to be secured in applied position thereto, at least one of said elements being in resilient engagement with said bowed member, and said attaching member also having an integral fastener element extending from said base for engaging a supporting part to secure said bowed member to said part.

3. A fastener device comprising a sheet metal resilient loop portion formed from a strip of spring metal and adapted to receive and grip an article, said loop having a bowed body portion and free end portions normally in spaced apart relation, each of said end portions having an integral element for interlocking relation one with another under the tension of said body portion thereby to close said loop, and a strip of rubber or the like material carried by the inner face of said body portion and arranged to form a complete ring when said loop is closed.

4. A fastener device comprising a resilient loop portion formed from a strip of spring sheet metal and adapted to receive and grip an article, said loop having a bowed body portion and free end portions normally in spaced apart relation, each of said end portions having a reverse-bend element for interlocking relation one with another under the tension of said body portion thereby closing said loop, and a strip of rubber carried by the inner face of said body portion and arranged to form a substantially complete concentric ring when said loop is closed, means securing said strip in abutting relation to said body at at least one point around the circumference of said ring, and said strip being separable from said body at at least one point on the circumference of said body so as to enable an attaching element to be extended between said body and said strip.

5. A fastener device comprising a resilient loop portion formed from a strip of spring metal and adapted to receive and grip an article, said loop having a bowed body portion and free end portions movable into tightening position, a strip of rubber and the like carried by the inner face of said body portion and arranged to form a substantially complete concentric ring when said loop is closed, means securing said strip in abutting relation to said body at at least one point around the circumference of said ring, and said strip being separable from said body adjacent a point on said body opposite said free end portions to enable an attaching element to be extended between said body and said strip at said last-mentioned point.

6. A fastener device comprising a resilient loop portion formed from a strip of spring metal and adapted to receive and hold an article, said loop having a bowed body portion and free end portions normally in spaced apart relation, each of said end portions having a hook element for interlocking engagement one with another under the tension of said body portion thereby to close said loop, and an integral yieldable arm element struck out of the plane of said bowed member, said bowed member and said arm cooperating to engage opposed sides of a support whereby said bowed member is secured to said support.

7. A fastener device comprising a bowed member adapted to receive and grip a plurality of conduits, said bowed member having integral free end portions movable into self-interlocking tightening position, a strip of relatively thick sponge rubber carried by the inner face of said bowed member and arranged to form a complete ring when said ends are moved into said tightened position, and said sponge rubber ring being compressible so as to surround and hold in assembly a varying number of conduits.

CHARLES L. HALL.